(12) United States Patent
Watanabe et al.

(10) Patent No.: US 8,838,369 B2
(45) Date of Patent: Sep. 16, 2014

(54) IDLING STOP CONTROL UNIT AND IDLING STOP CONTROL METHOD

(75) Inventors: Takashi Watanabe, Machida (JP); Yoshihiro Ayabe, Sano (JP); Yoshitomo Fukutomi, Tochigi (JP)

(73) Assignees: Nissan Motor Co., Ltd., Yokohama-shi (JP); Calsonic Kansei Corporation, Saitama-shi (JP)

( * ) Notice: Subject to any disclaimer, the term of this patent is extended or adjusted under 35 U.S.C. 154(b) by 226 days.

(21) Appl. No.: 13/502,438

(22) PCT Filed: Oct. 13, 2010

(86) PCT No.: PCT/JP2010/067910
§ 371 (c)(1),
(2), (4) Date: Apr. 17, 2012

(87) PCT Pub. No.: WO2011/048982
PCT Pub. Date: Apr. 28, 2011

(65) Prior Publication Data
US 2012/0215430 A1    Aug. 23, 2012

(30) Foreign Application Priority Data

Oct. 21, 2009  (JP) .................................. 2009-241963
Jul. 9, 2010   (JP) .................................. 2010-156956

(51) Int. Cl.
*F02N 11/08*   (2006.01)
*F02D 17/04*   (2006.01)
*F02D 29/02*   (2006.01)
*B60H 1/00*    (2006.01)
*F02N 11/14*   (2006.01)

(52) U.S. Cl.
CPC ......... *F02D 29/02* (2013.01); *F02N 2200/0806* (2013.01); *F02D 17/04* (2013.01); *F02N 11/084* (2013.01); *F02N 2200/0804* (2013.01); *B60H 1/00778* (2013.01); *F02N 2200/122* (2013.01); *Y02T 10/48* (2013.01)
USPC ........................................ 701/112; 123/179.3

(58) Field of Classification Search
USPC ............ 701/102, 112, 113; 123/179.3, 179.4, 123/179.1, 179.13
See application file for complete search history.

(56) References Cited

U.S. PATENT DOCUMENTS 6,817,330 B1 *  11/2004  Ogawa et al. .............. 123/179.4
2001/0015070 A1  8/2001  Hara
(Continued)

FOREIGN PATENT DOCUMENTS

JP    2000-179374 A    6/2000
JP    2000-289454 A    10/2000
(Continued)

OTHER PUBLICATIONS

Chinese Office Action dated Dec. 26, 2013, (8 pgs.).

*Primary Examiner* — Mahmoud Gimie
(74) *Attorney, Agent, or Firm* — Foley & Lardner LLP (57) ABSTRACT

An idling stop control unit (ISCU) provided in a vehicle including an air conditioner (S) which controls an air conditioning state of a passenger compartment of the vehicle. The idling stop control unit includes: idling stop prohibiting means for canceling idling stop to restart an engine (10) and prohibiting execution of idling stop when a switch for changing the air conditioning state is operated during idling stop in which the engine (10) is stopped when the vehicle is at a stop; and idling stop enabling means for automatically lifting the prohibition and enabling execution of idling stop when a predetermined condition is met.

11 Claims, 7 Drawing Sheets

(56) References Cited

U.S. PATENT DOCUMENTS

| | | |
|---|---|---|
| 2006/0137643 A1* | 6/2006 | Thompson et al. ........ 123/179.4 |
| 2006/0150937 A1* | 7/2006 | Lupo et al. ................. 123/179.4 |
| 2010/0057323 A1* | 3/2010 | Jourdes ........................ 701/101 |
| 2010/0064677 A1* | 3/2010 | Kawaguchi et al. ............ 60/431 |
| 2010/0095689 A1 | 4/2010 | Shiroyama et al. |

FOREIGN PATENT DOCUMENTS

| | | |
|---|---|---|
| JP | 2001-341515 A | 12/2001 |
| JP | 2003-193896 A | 7/2003 |
| JP | 2004-232550 A | 8/2004 |
| JP | 2006-214358 A | 8/2006 |
| JP | 2006-240459 A | 9/2006 |
| JP | 2007-278124 A | 10/2007 |
| JP | 2009-96395 A | 5/2009 |
| JP | 2010-030549 A | 2/2010 |

* cited by examiner

IDLING STOP CONTROL UNIT AND IDLING STOP CONTROL METHOD

TECHNICAL FIELD

The present invention relates to an idling stop control unit and an idling stop control method which are capable of canceling the idling stop state (the state where an engine is automatically stopped when the vehicle stops) by an occupant's operation.

BACKGROUND ART

If idling stop is executed while an air conditioner is in operation for cooling or dehumidification in a passenger compartment of a vehicle, a compressor stops along with the stop of the engine. In some cases, therefore, outlet temperature of air-conditioned air increases, which provides a feeling of discomfort to occupants, or the dehumidification performance of the air conditioner is reduced, which causes fog on windows.

Japanese Patent Application Publication No. 2000-289454 discloses an idling stop control unit capable of preventing the aforementioned feeling of discomfort or occurrence of fog on windows. According to the above-described idling stop control unit, an idling stop switch which is manually operated by an occupant is provided with an off switch for prohibiting idling stop, and the occupant operates this off switch to prohibit the idling stop.

SUMMARY OF INVENTION

Technical Problem

However, in the above-described unit, once the occupant presses the off switch to prohibit idling stop, the idling stop prohibiting state (the state where the engine does not automatically stop even if the vehicle stops) is maintained until the occupant presses an on switch. Accordingly, if the occupant forgets pressing the off switch, idling stop remains unexecuted, and the effect of idling stop on increasing the fuel efficiency cannot be obtained.

An object of the present invention is to provide an idling stop control unit and an idling stop control method which surely execute idling stop without a switch operation for canceling the idling stop prohibiting state and thereby provide the effect on increasing the fuel efficiency.

Solution to Problem

As aspect of the present invention is an idling stop control unit provided in a vehicle including an air conditioner which controls an air conditioning state of a passenger compartment of the vehicle. The idling stop control unit cancels idling stop to restart an engine and prohibits execution of idling stop when a switch for changing the air conditioning state is operated during the idling stop. Moreover, the idling stop control unit automatically lifts the prohibition and enables execution of idling stop when a predetermined condition is met.

DESCRIPTION OF EMBODIMENTS

Hereinafter, a description is given in detail of a specific embodiment to which the present invention is applied with reference to the drawings.

Figure 1:
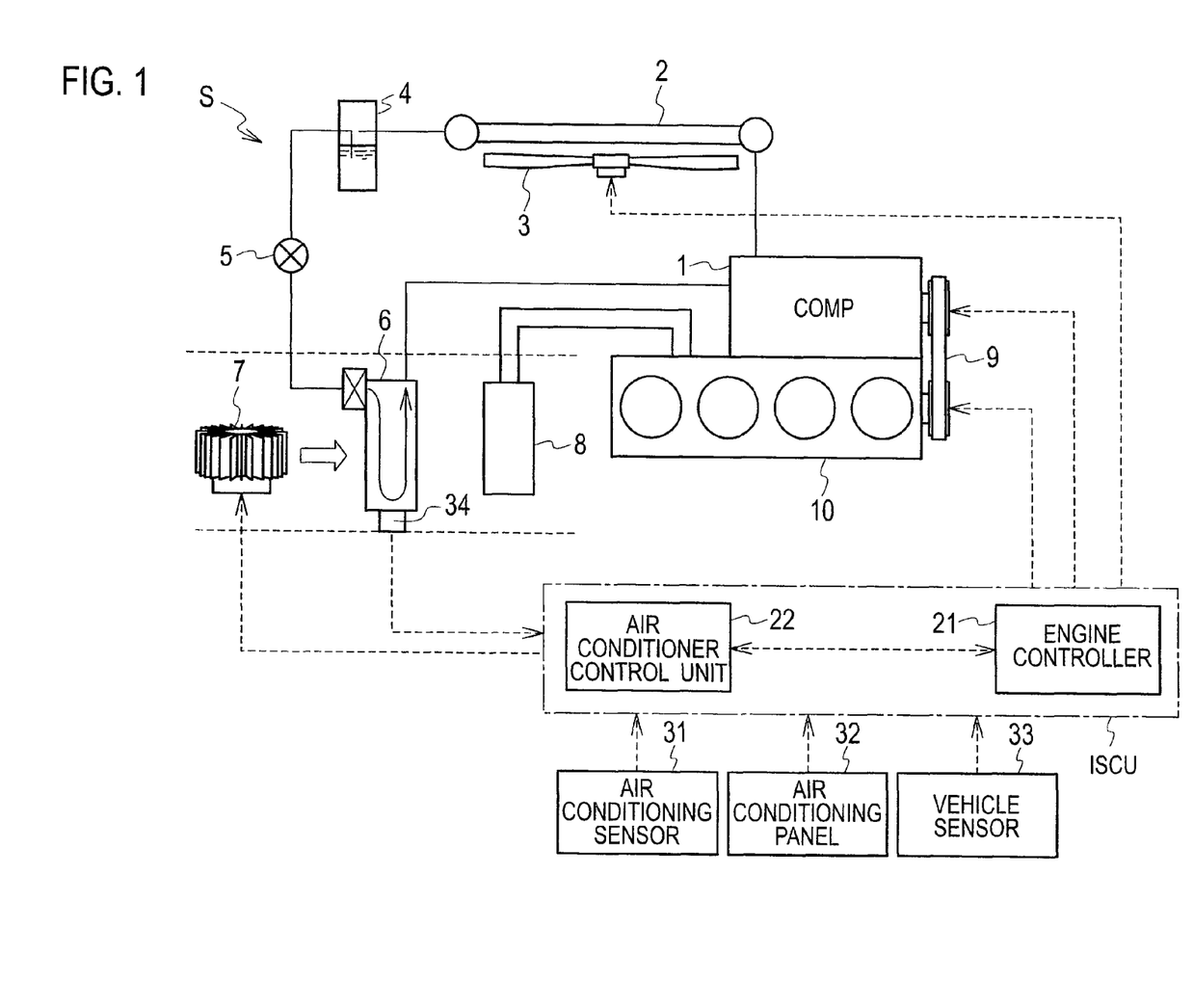
FIG. 1 is an entire system diagram illustrating a vehicle to which an idling stop control unit according to an embodiment of the present invention is applied.

As shown in FIG. 1, a vehicle according to the embodiment includes: an engine 10 for running the vehicle; an air conditioner S for controlling the air conditioning state of a passenger compartment of the vehicle; an idling stop control unit ISCU performing idling stop control; and various sensors and input units.

The air conditioner S includes a compressor 1, a heat exchanger 2, a cooling fan 3, a gas-liquid separator 4, an expansion valve 5, an evaporator 6, a blower fan 7, and a heater core 8 as shown in FIG. 1.

The compressor 1 includes an electromagnetic clutch for power connection and disconnection (not shown) and is connected to the engine 10 through the electromagnetic clutch and a belt 9. The compressor 1 is driven by the power of the engine 10 intermittently transferred by controlling energization of the electromagnetic clutch. The energization of the electromagnetic clutch is controlled by an engine controller 21 controlling the operating state of the engine 10.

The compressor 1 sucks, compresses, and discharges a refrigerant. The excessively-heated gas refrigerant of high temperature and high pressure discharged from the compressor 1 flows into the heat exchanger 2 and exchanges heat with outside air to be cooled and condensed. The condensed refrigerant flows into the gas-liquid separator 4 and is separated into gas and liquid. The liquid refrigerant from the gas-liquid separator 4 is reduced in pressure by the expansion valve 5 into a gas-liquid two-phase state of low pressure. The low-pressure refrigerant flows into the evaporator 6 and absorbs heat from air blown by the blower fan 7 to evaporate.

The evaporator 6 is accommodated in an air conditioner case, and air fed from the blower fan 7 passes through the evaporator 6 to be cooled. The air conditioner case also accommodates the heater core 8 to which waste heat (hot water) of the engine 10 is supplied. A part of or all of the air having passed through the evaporator 6 passes through the heater core 8 to be heated. The air fed from the blower fan 7 is thus supplied to the passenger compartment as conditioned air.

As shown in FIG. 1, the idling stop control unit ISCU includes: an engine controller 21 controlling the operating state of the engine 10; and an air conditioner control unit 22 controlling the operating state of the air conditioner S. The engine controller 21 and air conditioner control unit 22 are connected to each other through an in-vehicle network such as a control area network (CAN).

The idling stop control unit ISCU receives various types of signals from an air conditioning sensor 31, an air conditioning panel 32, a vehicle sensor 33, an EVA temperature sensor 34, and the like.

The air conditioning sensor 31 includes a solar sensor, an outside air sensor, an interior temperature sensor, an interior humidity sensor, an intake sensor, an outlet temperature sensor, and the like. The vehicle sensor 33 includes a vehicle speed sensor. The EVA temperature sensor 34 detects temperature of the evaporator 6. The signals from the sensors are used in calculation of load of the air conditioner S (air conditioner load) and the like when the air conditioner control unit 22 automatically controls the air conditioner S.

Figure 2:
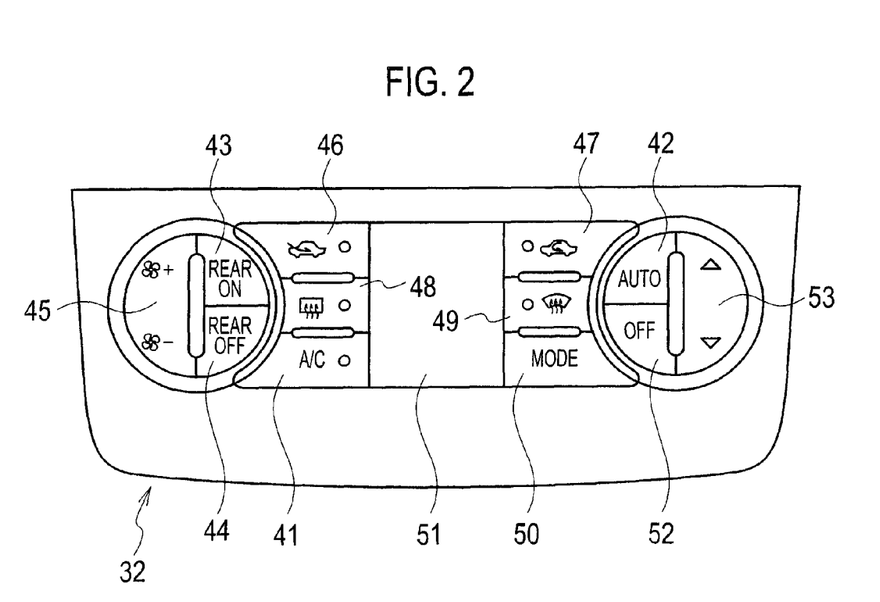
FIG. 2 is a view showing an example of an air conditioning panel of an air conditioner.

As shown in FIG. 2, the air conditioning panel 32 includes: an AC switch 41 (A/C SW) for activating the compressor 1 (switching on and off of the compressor 1); an AUTO switch 42 (AUTO SW) for automatically controlling the air volume, outlet temperature, and blowout mode according to the detection value of each sensor and a preset temperature; a rear on switch 43 for turning on a rear air conditioner; a rear off switch 44 for turning off the rear air conditioner; and a fan adjustment switch 45 for adjusting the air volume of the blower fan 7.

The air conditioning panel 32 further includes: a FRE switch 46 for introducing the outside air into the passenger compartment; a REC switch 47 for circulating the air in the passenger compartment; a rear window defogger switch 48 for defogging the rear window; a DEF switch 49 for defogging a windshield glass; a MODE switch 50 for switching front vents, foot vents, and the like; an OFF switch 52 for turning off an air conditioner operation screen 51 and all indicators and turning off the motor of the blower fan 7 and the compressor 1; and a temperature adjustment switch 53 for adjusting the interior temperature of the passenger compartment.

The switches of the air conditioning panel 32 are manually operated by an occupant who wants to change the air conditioning state. The operation signal from each switch is used to control the air conditioner S in the air conditioner control unit 22 according to the occupant's settings.

The air conditioner control unit 22 controls the preset temperature of the passenger compartment, the outlet port of the conditioned air, the inlet port, on/off of the AC switch 41 as an air conditioner switch and the AUTO switch 42 as the automatic control switch, and the like.

When idling stop is executed while the air conditioner S is in operation for cooling or heating of the passenger compartment, an increase or decrease in outlet temperature of the air-conditioned air adversely influences the occupant's comfort. In order to prevent the adverse influence on the occupant's comfort, the air conditioner control unit 22 automatically determines based on information inputted from the sensors whether the idling stop can be executed when the vehicle stops. The air conditioner control unit 22 then sends an idling stop cancel request signal or an idling stop enabling signal later described to the engine controller 21.

The engine controller 21 controls the operating state of the engine 10 and the working state of the cooling fan 3. Furthermore, the engine controller 21 receives the idling stop cancel request signal or idling stop enabling signal sent by the air conditioner control unit 22. When receiving the idling stop cancel request signal, the engine controller 21 does not execute idling stop. When receiving the idling stop enabling signal, the engine controller 21 executes idling stop if the other idling stop conditions are met (for example, if the brake pedal is stepped on, the vehicle speed is substantially zero, the acceleration pedal is not stepped on, and the engine speed is equal to idle speed).

Next, a description is given of idling sop control performed by the idling stop control unit ISCU.

If the vehicle according to the embodiment stops because of a traffic jam or at a stoplight, for example, the idling stop control unit ISCU executes idling stop to automatically stop the engine 10. If idling stop is executed while the air conditioner S is in operation for cooling or heating of the vehicle compartment, the compressor 1 of the air conditioner S stops when the engine 10 stops. Accordingly, the increase in the outlet temperature of the air-conditioned air increases the interior temperature and gives discomfort to an occupant, or reduction in humidification performance of the air conditioner S causes fog on windows. In order to change the air conditioning state and resolve such inconveniences, the occupant manually operates the switches provided for the air conditioning panel 32. The idling stop control unit ISCU then cancels the idling stop and restarts the engine 10 (cancels the idling stop state). The idling stop control unit ISCU then prohibits execution of idling stop (an idling stop prohibiting state). Moreover, if the predetermined conditions are met, the idling stop control unit ISCU automatically lifts the prohibition and returns to a state where execution of idling stop is enabled (returns to an idling stop enabling state). In other words, the idling stop controller ISCU includes: an idling stop prohibiting unit which cancels idling stop, restarts the engine 10, and prohibits execution of idling stop; and an idling stop enabling unit which automatically lifts the prohibition and enables execution of idling stop if predetermined conditions are met.

Figure 3:
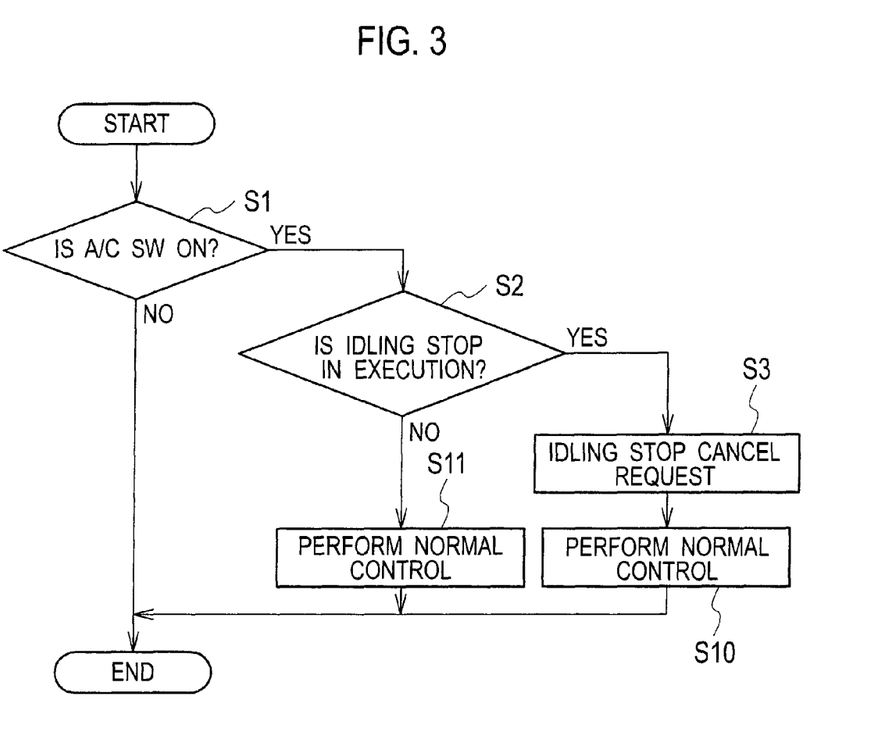
FIG. 3 is a flowchart showing a process to restart an engine and cancel an idling stop state when the air conditioner switch is operated during idling stop.
Figure 4:
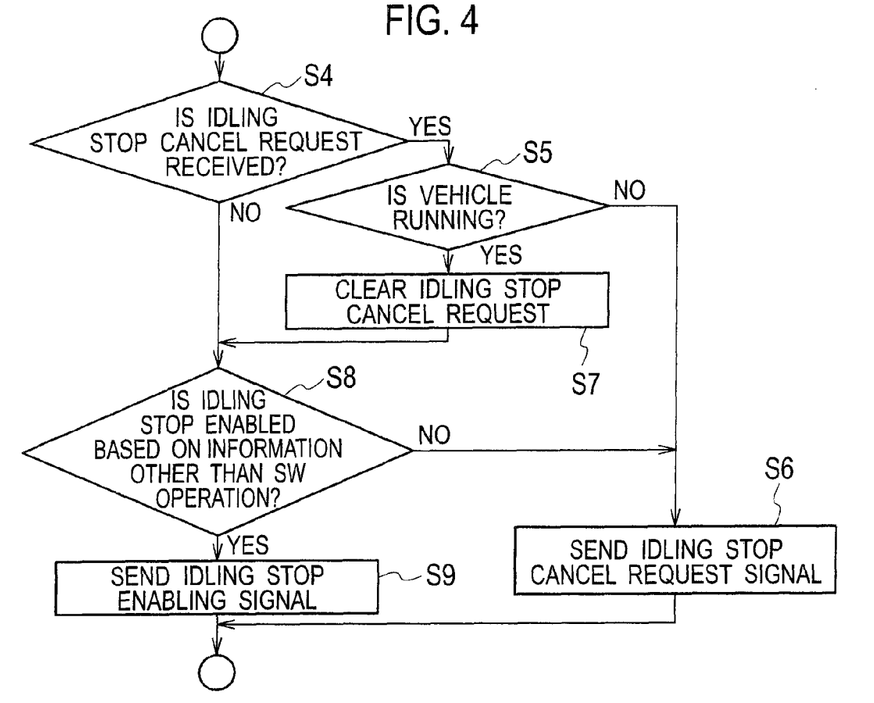
FIG. 4 is a flowchart showing a process executed after step S3 of FIG. 3.

The idling stop control is described more specifically with reference to the flowcharts of FIGS. 3 and 4.

The flowchart of FIG. 3 shows a process to restart the engine 10 and cancel the idling stop state when the AC switch 41 is operated during idling stop (at this time, the AC switch 41 is pressed to turn on the AC).

In the process of step S1 of FIG. 3, the air conditioner control unit 22 determines whether the AC switch 41 is operated. If the AC switch 41 is pressed (in the case of YES), the air conditioner control unit 22 determines that an operation to increase the air conditioner load is inputted. In a process of next step S2, the air conditioner control unit 22 determines whether idling stop is in execution. If determining in the process of step S2 that idling stop is in execution (in the case of YES), the air conditioner control unit 22 goes to a process of next step S3 and turns on an idling stop cancel request flag indicating that a request to cancel idling stop (an idling stop cancel request) is received from the occupant during idling stop. If the AC switch 41 is not operated in the process of step S1 (in the case of NO), the air conditioner control unit 22 terminates the process.

Processes executed after step S3 are described using the flowchart of FIG. 4. A series of processes shown in the flowchart of FIG. 4 are repeatedly executed by the air conditioner control unit 22 at regular time intervals.

In the process of step S4, the air conditioner control unit 22 determines whether the request to cancel idling stop is received (whether the idling stop cancel request flag is turned on). If determining in the process of step S4 that the idling stop cancel request is received (in the case of YES), the air conditioner control unit 22 determines whether the vehicle is running in a process of next step S5. The air conditioner control unit 22 determines that the vehicle is running if the vehicle speed detected by the vehicle speed sensor exceeds 5 km/h, for example. If determining in the process of step S5 that the vehicle is not running, that is, the vehicle is in the idling stop state (in the case of NO), in a process of next step 6, the air conditioner control unit 22 requests the engine controller 21 to perform a process to prohibit idling stop. To be specific, the air conditioner control unit 22 sends the idling stop cancel request signal to the engine controller 21. Upon receiving the idling stop cancel request signal from the air conditioner control unit 22, the engine controller 21 cancels execution of idling stop. The idling stop cancel request signal is sent from the air conditioner control unit 22 to the engine controller 21 each time the series of processes of FIG. 4 is repeatedly executed while the vehicle continues to be at a stop with the idling stop cancel request flag turned on. Accordingly, the engine controller 21 continues to cancel execution of idling stop, that is, prohibits execution of idling stop (maintains the idling stop prohibiting state).

On the other hand, if determining in the process of step S5 that the vehicle is running (in the case of YES), the air conditioner control unit 22 clears the idling stop cancel request (resets the idling stop cancel request flag) and goes to a process of step S8.

If determining in the process of step S4 that the idling stop cancel request is not received (in the case of NO), the air conditioner control unit 22 automatically determines in the process of step S8 whether idling stop can be executed based on information other than the occupant's switch operations. To be specific, the air conditioner control unit 22 automatically determines in the process of step S8 whether idling stop can be executed based on information inputted from each sensor in order to prevent the influence on the occupant's comfort due to an increase in outlet temperature at cooling or a decrease in outlet temperature at heating, for example.

If determining in the process of step S8 that idling stop is to be canceled (in the case of NO), the air conditioner control unit 22 goes to the process of step S6.

On the other hand, if determining in the process of step S8 that idling stop can be executed (in the case of YES), the air conditioner control unit 22 goes to the process of step S9 and sends the enabling signal to enable execution of idling stop (idling stop enabling signal) to the engine controller 21. When the engine controller 21 receives the idle stop enabling signal from the air conditioner control unit 22 and the other idling stop conditions are met, the engine controller 21 executes idling stop. Moreover, while the other idling stop conditions are met, the engine controller 21 continues execution of idling stop (maintains the idling stop state) as long as the idling stop enabling signal continues to be sent from the air conditioner control unit 22.

After requesting the engine controller 21 to execute the process to prohibit idling stop in the process of step S6 or sending an enabling signal to maintain the idling stop state to the engine controller 21 in the process of step S9, the air conditioner control unit 22 performs a process of step S10 of FIG. 3. In the process of step S10, the air conditioner control unit 22 performs normal air conditioning control and increases the air conditioner load as needed so as to implement an air conditioning state more comfortable for the occupants.

If determining in the process of step S2 that idling stop is not in execution (in the case of NO), the air conditioner control unit 22 goes to a process of step S11. In the process of step S11, the air conditioner control unit 22 performs normal air conditioning control in a similar manner to the process of step 10.

In the idling stop control shown in the flowcharts of FIGS. 3 and 4, if the AC switch 41 is pressed during idling stop, the engine 10 restarts to cancel the idling stop state, and execution of idling stop is prohibited. On the other hand, the prohibition is automatically lifted when the vehicle has started to run, and the next time the vehicle stops, idling stop is executed again. In the other words, after the cancel of the idling stop state by an operation of the AC switch 41, the idling stop prohibiting state is maintained for only a period after the AC switch 41 is pressed until the vehicle starts to run. After the vehicle starts to run, execution of idling stop is enabled again.

By the way, if idling stop is executed when the air conditioner S is in operation for cooling of the passenger compartment or the like, the compressor 1 stops with the stop of the engine 10, and the air conditioner stops working. The idling stop control unit ISCU includes a lamp controller which, during idling stop, turns off a lamp indicating that the air conditioner S is in operation. In this embodiment, the lamp controller keeps the AC lamp off during idling stop. Hereinafter, this process is described with reference to the flowchart of FIG. 5.

Figure 5:
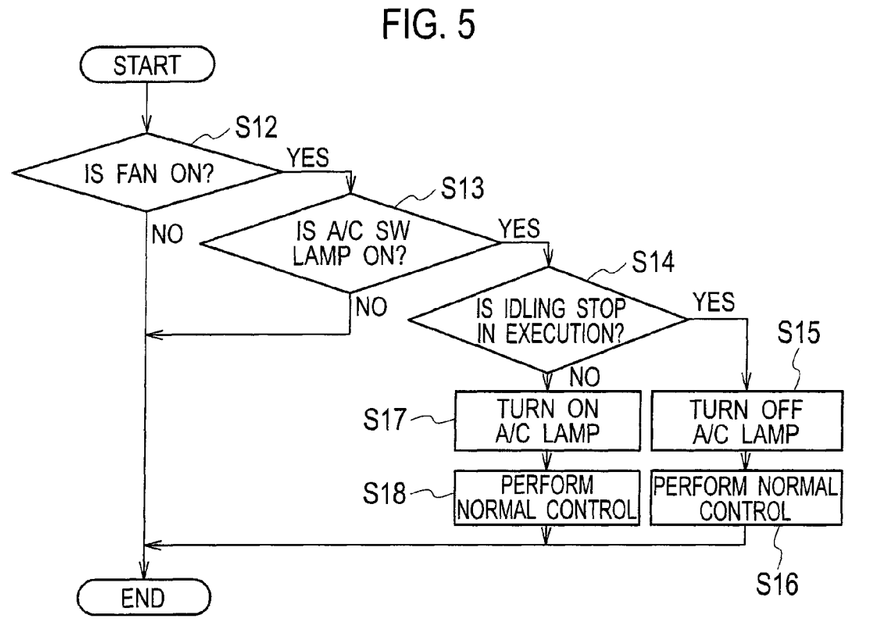
FIG. 5 is a flowchart showing a process to turn off a lamp indicating that the air conditioner is in operation.

At first, in the process of step S12, the air conditioner control unit 22 determines whether the blower fan 7 is on. If determining that the blower fan 7 is on (in the case of YES), in a process of next step S13, the air conditioner control unit 22 determines whether the lamp of the AC switch 41 is lighted. If determining that the lamp of the AC switch 41 is lighted (in the case of YES), the air conditioner control unit 22 goes to a process of step S14. On the other hand, if determining in the process of step S13 that the lamp of the AC switch 41 is not lighted (in the case of NO) or if determining in the process of step S12 that the blower fan 7 is off (in the case of NO), the air conditioner control unit 22 terminates the process.

In the process of step S14, the air conditioner control unit 22 determines whether the vehicle is in idling stop. If determining in the process of step S14 that the vehicle is in idling stop, the air conditioner control unit 22 turns off the AC lamp in the process of next step S15 and returns to normal control in a process of subsequent step S16. In this normal control, the air conditioner control unit 22 activates the air conditioner S again and turns on the AC lamp when the idling stop state is canceled and the vehicle has started to run.

On the other hand, if determining in the process of step S14 that the vehicle is not in idling stop operation, the air conditioner control unit 22 keeps the AC lamp on in a process of next step S17 and returns to the normal control in a process of subsequent step S18. The process of step S18 is the same as that of step S16.

According to the idling stop control unit ISCU of this embodiment, when the switch for changing the air conditioning state, for example, the AC switch 41 is operated during idling stop, the process to prohibit idling stop is requested from the air conditioner control unit 22 to the engine controller 21. The engine 10 then restarts to cancel the idling stop state, and execution of idling stop is prohibited. Accordingly, the air conditioning state of the passenger compartment can be kept comfortable during idling stop. In other words, according to the idling stop control unit ISCU, even if the air conditioner S stops during idling stop, an occupant having a feeling of discomfort with the air conditioning state of the passenger compartment operates the AC switch 41 to cancel the idling stop state, thus ensuring the comfortable air conditioning state. Moreover, the idling stop prohibiting state is automatically canceled when the vehicle starts to run, and idling stop is executed again the next time the vehicle stops. Accordingly, the idling stop prohibiting state is not maintained more than necessary, thus securing the effect of idling stop on increasing the fuel efficiency.

Moreover, the idling stop control unit ISCU of this embodiment automatically cancels the idling stop prohibiting state when the vehicle starts to run and executes idling stop again when the vehicle stops next time. This eliminates the need for occupant's switch operation to cancel the idling stop prohibiting state. According to the idling stop control unit ISCU, it is possible to avoid a situation where the idling stop prohibiting state is maintained and the fuel efficiency is reduced because the occupant forget to perform the switch operation to cancel the idling stop prohibiting state.

Moreover, according to the idling stop control unit ISCU of this embodiment, the lamp indicating that the air conditioner S is in operation (for example, the AC lamp) is turned off during idling stop. Accordingly, it is easy to cause an occupant to understand that the compressor 1 is stopped due to execution of idling stop or that the air conditioner is not working. Moreover, it is easy to cause an occupant to understand that when having a feeling of discomfort about the air conditioning state of the passenger compartment, the occupant can cancel the idling stop state and remove the feeling of discomfort by pressing the AC switch 41 again.

The idling stop control unit according to the aforementioned embodiment restarts the engine 10 and cancels the idling stop state when the AC switch 41 is operated during idling stop. However, the idling stop control unit according to the aforementioned embodiment may restarts the engine 10 and cancel the idling stop state when the AUTO switch 42 as an automatic control switch for adjusting the air volume, outlet temperature, and blowout mode is operated.

Figure 6:
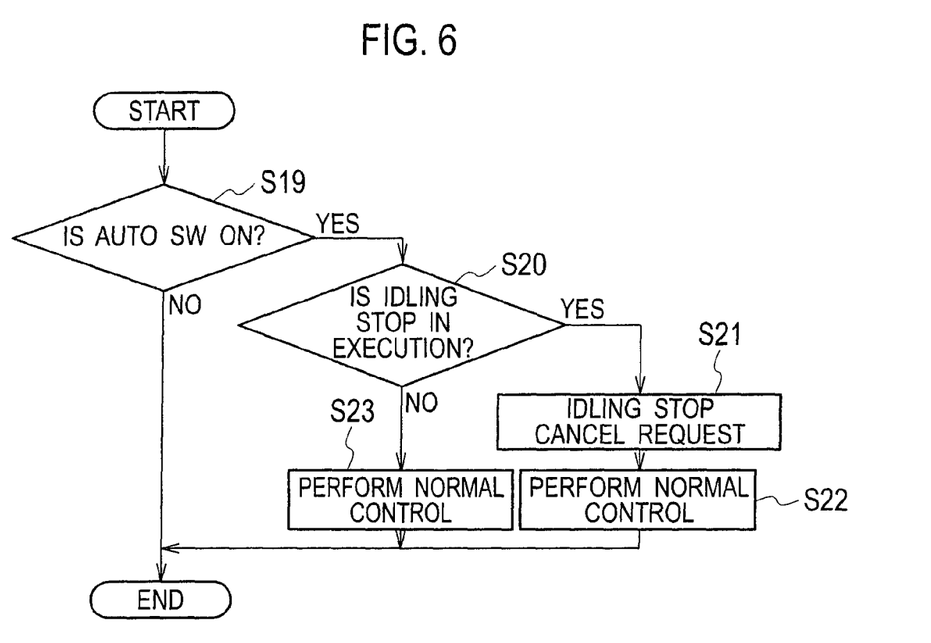
FIG. 6 is a flowchart showing a process to restart the engine and cancel the idling stop state when an automatic control switch is operated during idling stop.

The flowchart of FIG. 6 shows a process to restart the engine and cancel the idle stop state when the AUTO switch 42 is operated during idling stop.

In the process of step S19 in FIG. 6, the air conditioner control unit 22 determines whether the AUTO switch 42 is operated (in this example, whether the AUTO switch 42 is pressed).

When the AUTO switch 42 is operated (in the case of YES), the air conditioner control unit 22 determines that the operation increasing the air conditioner load is inputted. In a process of next step 20, the air conditioner control unit 22 determines whether idling stop is in execution. If determining in the process of step S20 that idling stop is in execution (in the case of YES), the air conditioner control unit 22 goes to a process of next step S21 and turns on the idling stop cancel request flag indicating that a request to cancel idling stop (the idling stop cancel request) is received from an occupant during idling stop. If the AUTO switch 42 is not operated in the process of step S19 (in the case of NO), the air conditioner control unit 22 terminates the process.

The processes executed in step S21 and subsequent steps are the same as the processes described using the flowchart of FIG. 4 and are therefore described briefly. Herein, the series of processes shown in the flowchart of FIG. 4 is repeatedly executed by the air conditioner control unit 22 at regular time intervals.

If the air conditioner control unit 22 determines that the idle stop cancel request is received and the vehicle is not running, the air conditioner control unit 22 requests the engine controller 21 to perform the process to prohibit idling stop. Upon receiving the request from the air conditioner control unit 22, the engine controller 21 prohibits execution of idling stop.

On the other hand, if determining that the idling stop cancel request is not received, the air conditioner control unit 22 automatically determines whether to execute idling stop based on information other than the occupant's switch operation. If determining that the vehicle has started to run but the idling stop cancel request is received, the air conditioner control unit 22 automatically determines whether to execute idling stop after clearing the idling stop cancel request.

If determining that idling stop is to be canceled through the automatic determination, the air conditioner control unit 22 requests the engine controller 21 to perform the process to prohibit idling stop. Upon receiving the request from the air conditioner control unit 22, the engine controller 21 prohibits execution of idling stop. If determining that idling stop can be executed, the air conditioner control unit 22 sends the idling stop enabling signal to the engine controller 21. The engine controller 21 executes idling stop when the idling stop enabling signal is received from the air conditioner control unit 22 and the other idling stop conditions are met.

The air conditioner control unit 22 performs a process of step S22 of FIG. 6 after requesting the engine controller 21 to perform the process to prohibit idling stop or sending the enabling signal to keep the idling stop state to the engine controller 21. In the process of step S22, the air conditioner control unit 22 performs normal air conditioning control and increases the air conditioner load as needed so as to implement an air conditioning state more comfortable for occupants.

If determining in the process of step S20 that idling stop is not in operation, the air conditioner control unit 22 goes to a process of step S23. In the process of step S23, the air conditioner control unit 22 performs normal air conditioning control in a similar manner to the process of step S22.

In the idling stop control shown in the flowchart of FIG. 6, when the AUTO switch 42 is pressed during idling stop, the engine 10 restarts to cancel the idling stop state, and execution of idling stop is prohibited. On the other end, the prohibition is automatically lifted when the vehicle has started to run, and idling stop is executed when the vehicle stops next time. In other words, after the cancel of the idling stop state by an operation of the AUTO switch 42, the idling stop prohibiting state is maintained for only a period after the AUTO switch 42 is pressed until the vehicle starts to run. After the vehicle starts to run, execution of idling stop is enabled again.

As described above, according to the idling stop control unit ISCU, when the AUTO switch 42 as the switch for changing the air conditioning state is operated during idling stop, the process to prohibit idling stop is requested from the air conditioner control unit 22 to the engine controller 21, and the engine 10 restarts to cancel the idling stop state. Moreover, execution of idling stop is prohibited. Accordingly, the air conditioning state of the passenger compartment can be kept comfortable even at idling stop. In other words, even if the air conditioner S stops during idling stop, the occupant having a feeling of discomfort about the air conditioning state of the passenger compartment can cancel the idling stop state and secure a comfortable air conditioning state by operating the AUTO switch 42. Moreover, the idling stop prohibiting state is automatically canceled when the vehicle starts to run, and idling stop is executed again when the vehicle stops next time. Accordingly, the idling stop prohibiting state is not maintained more than necessary, thus securing the effect of idling stop on increasing the fuel efficiency.

Moreover, if it is configured that idling stop is prohibited when the AUTO switch 42 is operated like this example, the AC switch 41 does not need to include the function of prohibiting idling stop in the case where heating is performed with the compressor 1 being turned off. It is therefore possible to avoid reduction in fuel efficiency due to an excessive increase in the idling stop prohibition function.

Moreover, in addition to the AC switch 41 and the AUTO switch 42, the switch for changing the air conditioning state is the switch for adjusting the outlet temperature or the air volume (for example, the fan adjustment switch 45 for adjusting the air volume of the blower fan 7 or the temperature adjustment switch 53 for adjusting the interior temperature of the passenger compartment). These switches may be provided with the aforementioned idling stop prohibition function. The idling stop control unit ISCU therefore restarts the engine 10 and cancels the idling stop state when any one of these switches is operated so as to make the air conditioning state comfortable or so as to increase the air conditioner load.

Figure 7:
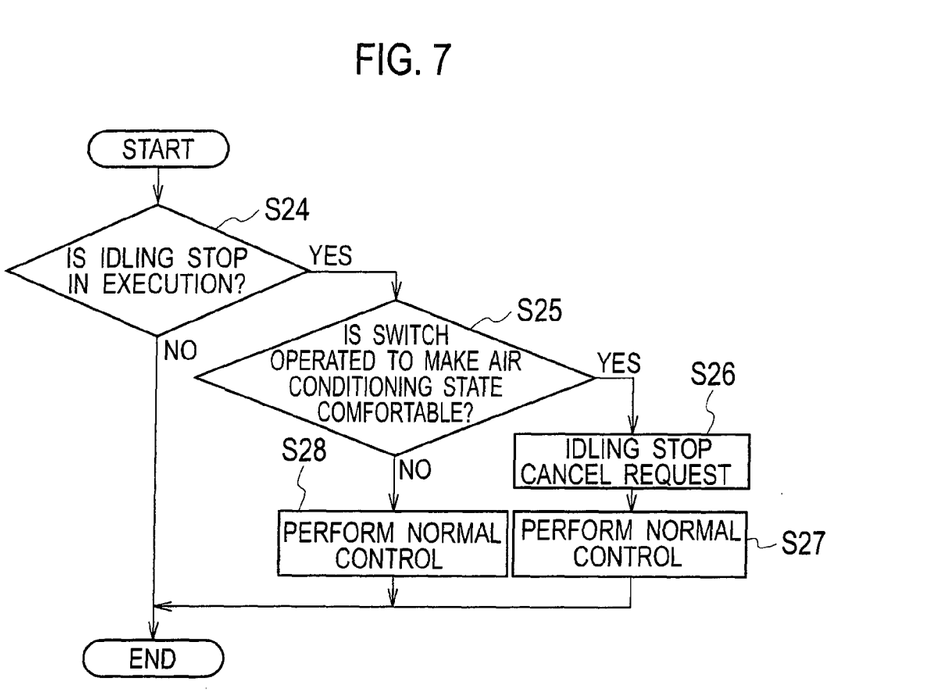
FIG. 7 is a flowchart showing a process to restart the engine and cancel the idling stop state when a switch for adjusting outlet temperature or air volume is operated so as to increase air conditioning load.

The flowchart of FIG. 7 shows a process to restart the engine and cancel the idling stop state when the switch for adjusting the outlet temperature or air volume is operated so as to increase the air conditioning load (make the air conditioning state comfortable) during idling stop.

In a process of step S24, the air conditioner control unit 22 determines whether the idling stop is in execution. If determining in the process of step S24 that the idling stop is in execution (in the case of YES), the air conditioner control unit 22 goes to a process of next step S25.

In the process of step S25, the air conditioner control unit 22 determines whether the fan adjustment switch 45 or temperature adjustment switch 53 is operated so as to make the air conditioning state comfortable or so as to increase the air conditioner load when the air conditioning state of the vehicle compartment changes because of execution of idling stop, for example, in a situation where it is predicted that the occupant feels hot or feels that fog on windows reduces visibility when the interior temperature in the passenger compartment changes. For example, in a situation where it is predicted that the occupant feels hot because of increasing temperature in the passenger compartment, the air conditioner control unit 22 determines whether the temperature adjustment switch 53 is operated so as to reduce the interior temperature of the passenger compartment or whether the fan adjustment switch 45 is operated so as to increase the air volume of the blower fan 7. Alternatively, in a situation where it is predicted that the occupant feels cold because of falling temperature in the passenger compartment, the air conditioner control unit 22 determines whether the temperature adjustment switch 53 is operated so as to increase the interior temperature of the passenger compartment or whether the fan adjustment switch 45 is operated so as to reduce the air volume of the blower fan 7.

If determining in the process of step S25 that the fan adjustment switch 45 is operated so as to make the air conditioning state comfortable, for example, the air conditioner control unit 22 goes to a process of next step S26.

The processes executed in step S26 and subsequent steps are the same as those described using the flowchart of FIG. 4 and are briefly described. The series of processes shown in the flowchart of FIG. 4 are repeatedly executed by the air conditioner control unit 22 at regular time intervals.

If determining that the idling stop cancel request is received and the vehicle is not running, the air conditioner control unit 22 requests the engine controller 21 to perform the process to prohibit idling stop. Upon receiving the request from the air conditioner control unit 22, the engine controller 21 prohibits execution of idling stop.

On the other hand, if determining that the idling stop cancel request is not received, the air conditioner control unit 22 automatically determines whether to execute idling stop based on the information other than the occupant's switch operation. If determining that the vehicle has started to run but the idling stop cancel request is received, the air conditioner control unit 22 automatically determines whether to execute idling stop after clearing the idling stop cancel request.

If determining that idling stop is to be canceled through the automatic determination, the air conditioner control unit 22 requests the engine controller 21 to perform the process to prohibit idling stop. Upon receiving the request from the air conditioner control unit 22, the engine controller 21 prohibits execution of idling stop. If determining that execution of idling stop can be executed, the air conditioner control unit 22 sends the idling stop enabling signal to the engine controller 21, and the engine controller 21 executes idling stop if the idling stop enabling signal is received from the air conditioner control unit 22 and the other idling stop conditions are met.

After requesting the engine controller 21 to perform the process to prohibit idling stop or sending the enabling signal to maintain the idling stop state to the engine controller 21, the air conditioner control unit 22 performs a process of step S27 of FIG. 7. In the process of step S27, the air conditioner control unit 22 performs normal air conditioning control and increases the air conditioning load as needed so as to implement an air conditioning state more comfortable for the occupant.

In the process of step S25, if determining that the operational input to the fan adjustment switch 45 is not an operational input to make the air conditioning state comfortable (in the case of NO), the air conditioner control unit 22 goes to a process of step S28. In the process of step S28, the air conditioner control unit 22 performs the normal air conditioning control in a similar manner to the process of step S27.

As described above, according to the idle stop control unit ISCU, when the switch for adjusting the outlet temperature or air volume is operated during idling stop so as to make the air conditioning state comfortable, that is, so as to increase the air conditioning load, the process to prohibit idling stop is requested by the air conditioner control unit 22 to the engine controller 21, and the engine 10 restarts to cancel the idling stop state. Moreover, execution of idling stop is prohibited. Accordingly, the air conditioning state of the vehicle compartment can be kept comfortable even during idling stop. Moreover, the idling stop prohibiting state is automatically canceled when the vehicle has started to run, and idling stop is executed again when the vehicle stops next time. The idling stop prohibiting state is therefore not maintained more than needed, and the effect of idling stop on increasing the fuel efficiency can be ensured.

The idling stop control units ISCU described above cancel the idling stop state and turn into the idling stop prohibiting state when a switch for changing the air conditioning state is operated by the occupant. The idling stop control units ISCU then automatically lift the idling stop prohibiting state and return to the idling stop enabling state when the vehicle starts to run. However, the conditions for returning to the idling stop enabling state are not limited to the above. The idling stop control unit ISCU may automatically cancels the idling stop prohibiting state and returns to the idling stop enabling state when the conditions other than the condition that the vehicle starts to run are met as shown in the flowcharts of FIGS. 8 to 12, for example. FIGS. 8 to 12 are flowcharts corresponding to FIG. 4, and the same processes thereof as the processes of FIG. 4 are given the same numerals.

Figure 8:
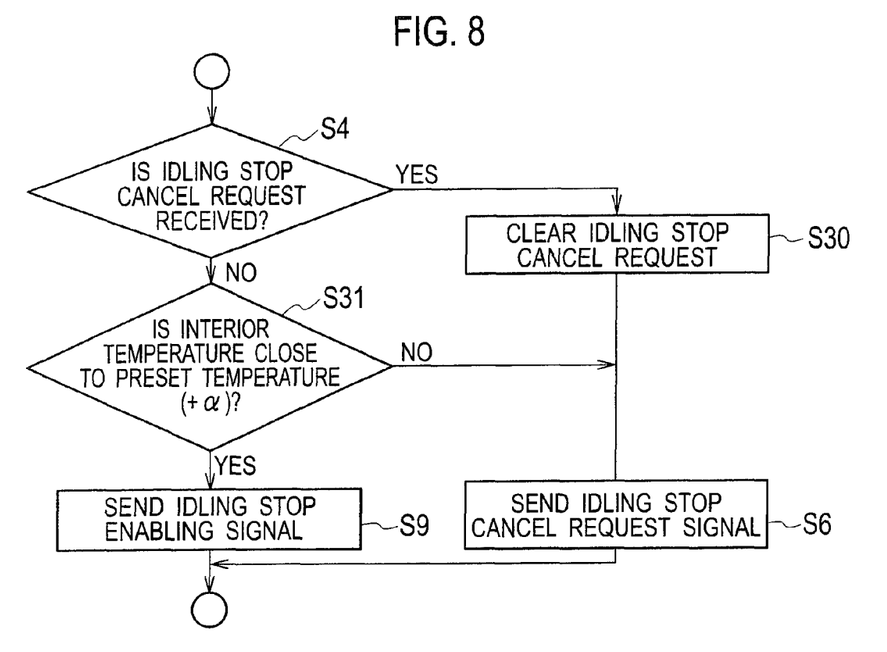
FIG. 8 is a flowchart showing a process to return to an idling stop enabling state when interior temperature comes close to a preset temperature.

In an example of FIG. 8, the idling stop control unit ISCU automatically cancels the idling stop prohibiting state and returns to the idling stop enabling state when the interior temperature of the passenger compartment is close to a preset temperature. The interior temperature of the passenger compartment is measured by the interior temperature sensor included in the air conditioning sensor 31. The preset temperature is a temperature set by the occupant.

If determining in the process of step S4 that the idling stop cancel request is received (in the case of YES), the air conditioner control unit 22 goes to a process of next step S30 and clears the idling stop cancel request (resets the idling stop cancel flag). In the process of the next step S6, the air conditioner control unit 22 requests the engine controller 21 to perform the process to prohibit idling stop. On the other hand, if determining in the process of step S4 that the idling stop cancel request is not received (in the case of NO), the air conditioner control unit 22 goes to a process of step S31.

In the process of step S31, the air conditioner control unit 22 determines whether the interior temperature of the passenger compartment is close to the preset temperature (including the correction amount α). Herein, the air conditioner control unit 22 first reads the interior temperature from the interior temperature sensor and determines whether the read interior temperature is close to the preset temperature. If the interior temperature is close to the preset temperature (in the case of YES), the air conditioner control unit 22 goes to the process of step S9 and sends the enabling signal to enable execution of idling stop to the engine controller 21. On the other hand, if the interior temperature is not close to the preset temperature (in the case of NO), the air conditioner control unit 22 goes to the process of step S6 and requests the engine controller 21 to perform the process to prohibit idling stop. The interior temperature close to the preset temperature refers to a temperature not less than the preset temperature −0.5° C. and not more than the preset temperature +0.5° C., for example. The magnitude of this range is not particularly limited, and the optimal width thereof can be properly calculated by experiments or the like.

The idling stop control unit ISCU executing the process shown in the flowchart of FIG. 8 automatically cancels the idling stop prohibiting state and returns to the idling stop enabling state when the interior temperature of the passenger compartment is close to the preset temperature (including the correction amount α), that is, when the air conditioning state in the passenger compartment becomes comfortable for the occupant even after canceling the idling stop state and turning into the idling stop prohibiting state. Accordingly, it is possible to reduce unnecessary idling without reducing the occupant's comfort and therefore provide the effect on increasing the fuel efficiency.

Figure 9:
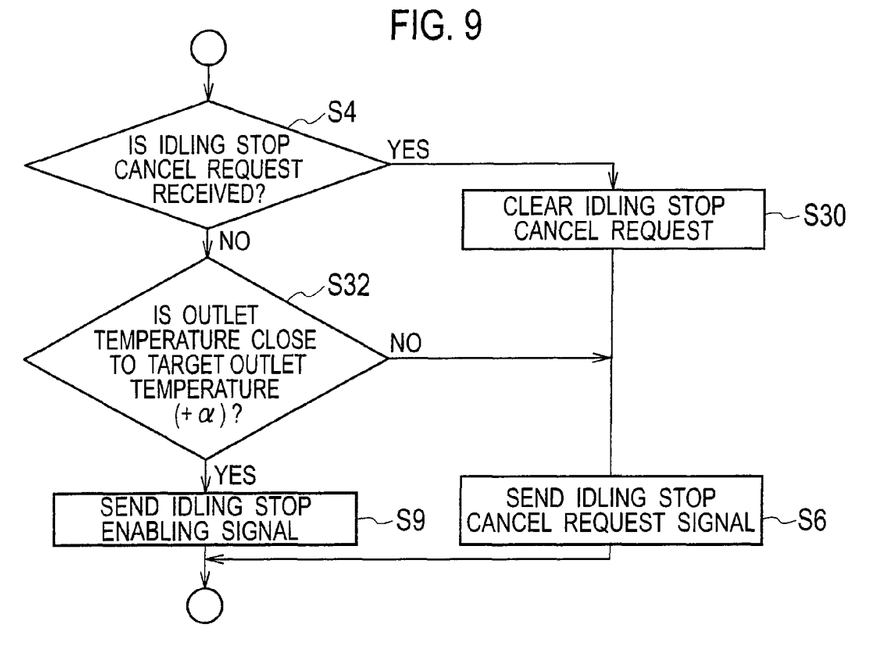
FIG. 9 is a flowchart showing a process to return to the idling stop enabling state when outlet temperature comes close to target outlet temperature.

In an example of FIG. 9, the idling stop control unit ISCU automatically cancels the idling stop prohibiting state and returns to the idling stop enabling state when the outlet temperature of air-conditioned air blown into the passenger compartment is close to a target outlet temperature. The outlet temperature of the air-conditioned air is measured by the outlet temperature sensor included in the air conditioning sensor 31. As for the target outlet temperature, outlet temperature at which the occupant feels comfortable in the passenger compartment is calculated based on experiments and the like and is set as the target outlet temperature.

If determining in the process of step S4 that the idling stop cancel request is received (in the case of YES), the air conditioner control unit 22 goes to the process of the next step S30 and clears the idling stop cancel request (resets the idling stop cancel flag). In the process of the next step S6, the air conditioner control unit 22 requests the engine controller 21 to perform the process to prohibit idling stop. On the other hand, if determining in the process of step S4 that the idling stop cancel request is not received (in the case of NO), the air conditioner control unit 22 goes to a process of step S32.

In the process of step S32, the air conditioner control unit 22 determines whether the outlet temperature of air-conditioned air is close to the target outlet temperature (including the correction amount α). Herein, the air conditioner control unit 22 first reads the outlet temperature and target outlet temperature and determines whether the read outlet temperature is close to the target outlet temperature. If the outlet temperature is close to the target outlet temperature (in the case of YES), the air conditioner control unit 22 goes to the process of step S9 and sends the enabling signal to enable execution of idling stop to the engine controller 21. On the other hand, if the outlet temperature is not close to the target outlet temperature (in the case of NO), the air conditioner control unit 22 goes to the process of step S6 and requests the engine controller 21 to perform the process to prohibit idling stop. The outlet temperature close to the target outlet temperature refers to a temperature not less than the target outlet temperature −0.5° C. and not more than the target outlet temperature +0.5° C., for example. The magnitude of this range is not particularly limited, and the optimal width thereof can be properly calculated by experiments or the like.

The idling stop control unit ISCU executing the process shown in the flowchart of FIG. 9 automatically cancels the idling stop prohibiting state and returns to the idling stop enabling state when the outlet temperature of the air-conditioned air is close to the target outlet temperature (including the correction amount α), that is, when the air conditioning state in the passenger compartment becomes comfortable for the occupant even after canceling the idling stop state and turning into the idling stop prohibiting state. Accordingly, it is possible to reduce unnecessary idling without reducing the occupant's comfort and therefore provide the effect on increasing the fuel efficiency.

Figure 10:
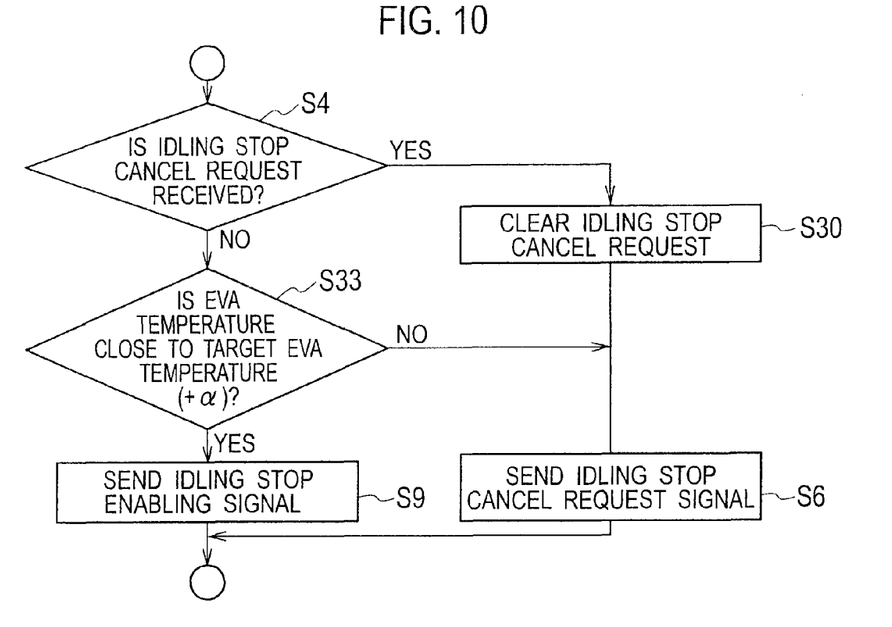
FIG. 10 is a flowchart showing a process to return to the idling stop enabling state when evaporator temperature comes close to target evaporator temperature.

In an example of FIG. 10, the idling stop control unit ISCU automatically cancels the idling stop prohibiting state and returns to the idling stop enabling state when the temperature of the evaporator 6 (EVA temperature) is close to a target evaporator temperature (target EVA temperature). The temperature of the evaporator 6 is measured by the EVA temperature sensor 34. As for the target evaporator temperature, the temperature of the evaporator 6 at which the occupant feels comfortable in the passenger compartment is previously calculated based on experiments and the like and is set as the target evaporator temperature.

If determining in the process of step S4 that the idling stop cancel request is received (in the case of YES), the air conditioner control unit 22 goes to the process of the next step S30 and clears the idling stop cancel request (resets the idling stop cancel flag). In the process of the next step S6, the air conditioner control unit 22 requests the engine controller 21 to perform the process to prohibit idling stop. On the other hand, if determining in the process of step S4 that the idling stop cancel request is not received (in the case of NO), the air conditioner control unit 22 goes to a process of step S33.

In the process of step S33, the air conditioner control unit 22 determines whether the temperature of the evaporator 6 is close to the target evaporator temperature (including the correction amount α). Herein, the air conditioner control unit 22 first reads the evaporator temperature from the EVA temperature sensor 34 and determines whether the read evaporator temperature is close to the target evaporator temperature. If the evaporator temperature is close to the target evaporator temperature (in the case of YES), the air conditioner control unit 22 goes to the process of step S9 and sends the enabling signal to enable execution of idling stop to the engine controller 21. On the other hand, if the evaporator temperature is not close to the target evaporator temperature (in the case of NO), the air conditioner control unit 22 goes to the process of step S6 and requests the engine controller 21 to perform the process to prohibit idling stop. The evaporator temperature close to the target evaporator temperature refers to a temperature not less than the target evaporator temperature −0.5° C. and not more than the target evaporator temperature +0.5° C., for example. The magnitude of this range is not particularly limited, and the optimal width thereof can be properly calculated by experiments or the like.

The idling stop control unit ISCU executing the process shown in the flowchart of FIG. 10 automatically cancels the idling stop prohibiting state and returns to the idling stop enabling state when the temperature of the evaporator 6 is close to the target evaporator temperature (including the correction amount α), that is, when the air conditioning state in the passenger compartment becomes comfortable for the occupant even after canceling the idling stop state and turning into the idling stop prohibiting state. Accordingly, it is possible to reduce unnecessary idling without reducing the occupant's comfort and therefore provide the effect on increasing the fuel efficiency.

Figure 11:
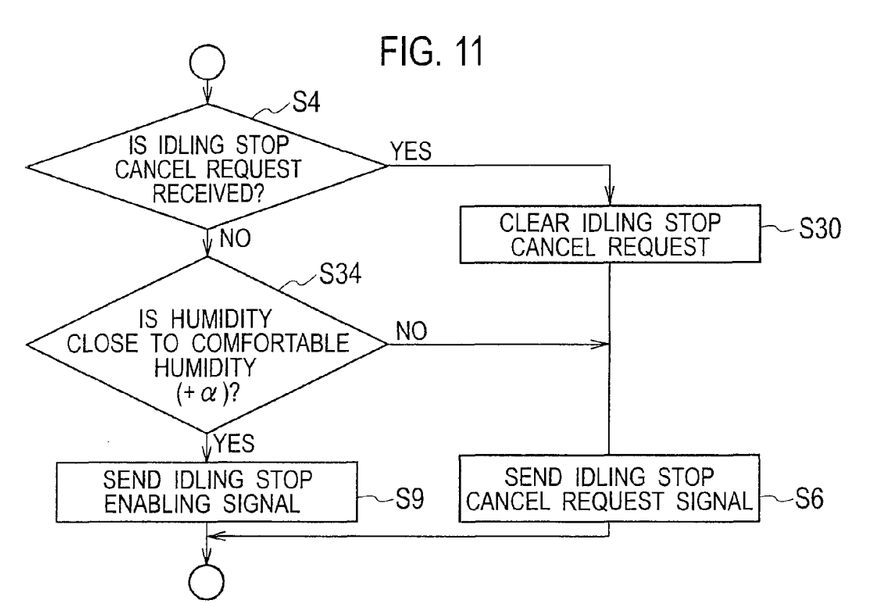
FIG. 11 is a flowchart showing a process to return to the idling stop enabling state when humidity comes close to comfortable humidity.

In an example of FIG. 11, the idling stop control unit ISCU automatically cancels the idling stop prohibiting state and returns to the idling stop enabling state when humidity in the passenger compartment is close to a comfortable humidity. The humidity is measured by an interior humidity sensor included in the air conditioning sensor 31. As for the comfortable humidity, humidity at which the occupant feels comfortable in the passenger compartment is previously calculated based on experiments and the like and is set as the comfortable humidity.

If determining in the process of step S4 that the idling stop cancel request is received (in the case of YES), the air conditioner control unit 22 goes to the process of the next step S30 and clears the idling stop cancel request (resets the idling stop cancel flag). In the process of the next step S6, the air conditioner control unit 22 requests the engine controller 21 to perform the process to prohibit idling stop. On the other hand, if determining in the process of step S4 that the idling stop cancel request is not received (in the case of NO), the air conditioner control unit 22 goes to a process of step S34.

In the process of step S34, the air conditioner control unit 22 determines whether the humidity is close to the comfortable humidity (including the correction amount α). Herein, the air conditioner control unit 22 first reads the humidity from the interior humidity sensor and determines whether the read humidity is close to the comfortable humidity. If the humidity is close to the comfortable humidity (in the case of YES), the air conditioner control unit 22 goes to the process of step S9 and sends the enabling signal to enable execution of idling stop to the engine controller 21. On the other hand, if the humidity is not close to the comfortable humidity (in the case of NO), the air conditioner control unit 22 goes to the process of step S6 and requests the engine controller 21 to perform the process to prohibit idling stop. The humidity close to the target humidity refers to a humidity not less than the target humidity −0.5° C. and not more than the target humidity +0.5° C., for example. The magnitude of this range is not particularly limited, and the optimal width thereof can be properly calculated by experiments or the like.

The idling stop control unit ISCU executing the process shown in the flowchart of FIG. 11 automatically cancels the idling stop prohibiting state and returns to the idling stop enabling state when the humidity is close to the comfortable humidity (including the correction amount α), that is, when the air conditioning state of the passenger compartment becomes comfortable for the occupant even after canceling the idling stop state and turning into the idling stop prohibiting state. Accordingly, it is possible to reduce unnecessary idling without reducing the occupant's comfort and therefore provide the effect on increasing the fuel efficiency.

Figure 12:
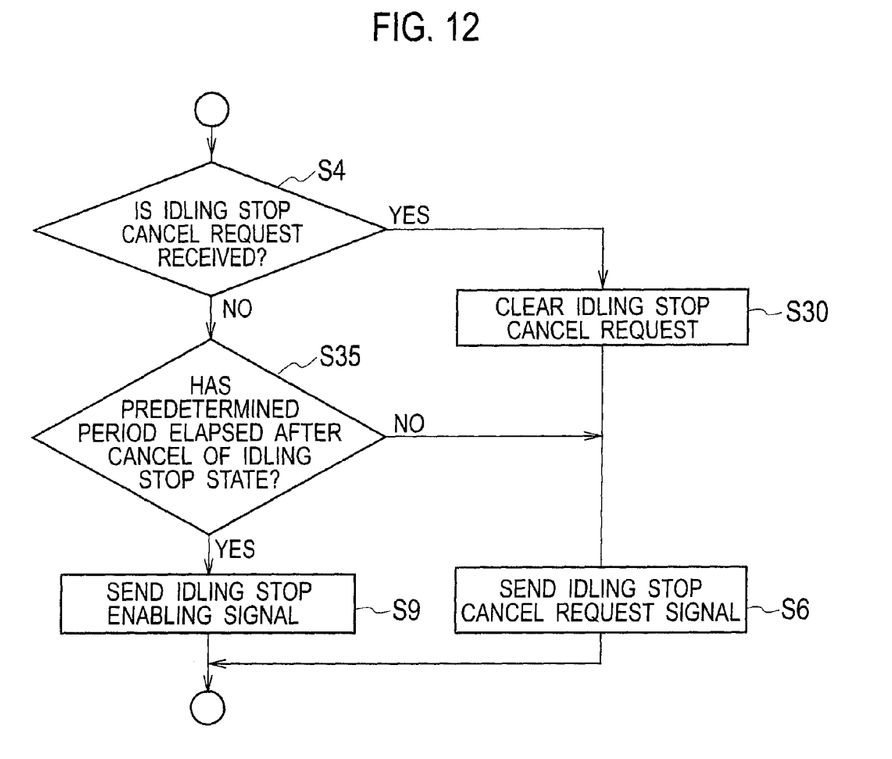
FIG. 12 is a flowchart showing a process to return to the idling stop enabling state when a predetermined period of time has elapsed after the idling stop state is canceled.

In an example of FIG. 12, the idling stop control unit ISCU automatically cancels the idling stop prohibiting state and returns to the idling stop enabling state a predetermined period of time after the idling stop state is canceled. The time which has elapsed after the cancel of the idling stop state is measured by a timer provided for the air conditioner control unit 22. The predetermined period of time is set to a certain fixed time or a predetermined variable time. The predetermined variable time can be set longer than an idling stop time (duration time of the idling stop state), for example. Generally, the longer the duration time of the idling stop state, the more time it takes for the temperature, humidity, and the like in the passenger compartment to become comfortable for the occupant after the idling stop state is canceled. This can be addressed by setting the predetermined period of time (predetermined variable time) equal to the idling stop time.

If determining in the process of step S4 that the idling stop cancel request is received (in the case of YES), the air conditioner control unit 22 goes to the process of the next step S30 and clears the idling stop cancel request (resets the idling stop cancel flag). In the process of the next step S6, the air conditioner control unit 22 requests the engine controller 21 to perform the process to prohibit idling stop. On the other hand, if determining in the process of step S4 that the idling stop cancel request is not received (in the case of NO), the air conditioner control unit 22 goes to a process of step S35.

In the process of step S35, the air conditioner control unit 22 determines whether the predetermined period of time has elapsed after the idling stop state is canceled. Herein, the air conditioner control unit 22 first reads the elapsed time from the cancel of the idling stop state, which is measured by the timer, and determines whether the elapsed time exceeds the predetermined period of time. If the elapsed time exceeds the predetermined period of time (in the case of YES), the air conditioner control unit 22 goes to the process of step S9 and sends the enabling signal to enable execution of idling stop to the engine controller 21. On the other hand, if the elapsed time does not exceed the predetermined period of time (in the case of NO), the air conditioner control unit 22 goes to the process of step S6 and requests the engine controller 21 to perform the process to prohibit idling stop.

The idling stop control unit ISCU executing the process shown in the flowchart of FIG. 12 automatically cancels the idling stop prohibiting state and returns to the idling stop enabling state when the predetermined period of time has elapsed even after canceling the idling stop state and turning into the idling stop prohibiting state. Accordingly, it is possible to reduce unnecessary idling and provide the effect on increasing the fuel efficiency even if the occupant forgets to perform the operation for canceling the idling stop prohibiting state.

Desirably, at cooling, the higher the outside temperature, the longer the predetermined period of time in the process of step S35 is set, and at heating, the lower the outside temperature is, the longer the predetermined period of time is set. This is because it takes longer time for the passenger compartment to become comfortable after the idling stop state is canceled if the outside temperature is higher at cooling or is lower at heating. Moreover, it is desirable that the predetermined period of time be set longer for larger solar radiation at cooling and set shorter for smaller solar radiation at heating. This is because the longer time it takes for the passenger compartment to become comfortable after the idling stop state is canceled, the larger the solar radiation at cooling or the smaller the solar radiation at heating.

As described above, the predetermined period of time in the process of step S35 is properly changed according to the outside temperature or solar radiation. This can improve the occupant's comfort in the passenger compartment according to the external environment while reducing unnecessary idling, thus providing the effect on increasing the fuel efficiency.

Hereinabove, the description is given of the embodiment of the present invention. The above embodiment is just an example described for easy understanding of the present invention, and the present invention is not limited to the above embodiment. The technical scope of the present invention is not limited to the specific technical matters disclosed in the above embodiment and includes various modifications, changes, alternative techniques, and the like which can be easily derived from the embodiment.

The application is based upon and claims the benefit of priority from Japanese Patent Applications No. 2009-241963, filed Oct. 21, 2009, and No. 2010-156956 filed Jul. 9, 2010; the entire of which are incorporated herein by reference.

INDUSTRIAL APPLICABILITY

According to the idling stop control unit of the present invention, when the switch for changing the air conditioning state is manually operated during idling stop, execution of idling stop is prohibited. The prohibition is automatically canceled when the predetermined conditions are met, and the execution of idling stop is enabled. According to the idling stop control unit of the present invention, it is possible to maintain a comfortable air conditioning state in the passenger compartment and ensure execution of idling stop when the vehicle stops next time without the switch operation for canceling the idling stop prohibiting state. The effect of idling stop on increasing the fuel efficiency can be surely provided. Consequently, the present invention is applicable to an idling stop control unit in which the occupant cancels the idling stop state according to the air conditioning state in the passenger compartment.

REFERENCE SIGNS LIST

1 COMPRESSOR
7 BLOWER FAN
10 ENGINE
21 ENGINE CONTROLLER
22 AIR CONDITIONER CONTROL UNIT
31 AIR CONDITIONING SENSOR
41 AC SWITCH (AIR CONDITIONER SWITCH)
42 AUTO SWITCH (AUTOMATIC CONTROL SWITCH)
45 FAN ADJUSTMENT SWITCH
53 TEMPERATURE ADJUSTMENT SWITCH

The invention claimed is:

1. An idling stop control unit provided in a vehicle including an air conditioner contol unit which controls an air conditioning state of a passenger compartment of the vehicle, the idling stop control unit comprising:

an idling stop prohibiting unit configured to cancel an idling stop to restart an engine and prohibit execution of the idling stop when a switch configured to change the air conditioning state is operated during the idling stop, in which the engine is stopped when the vehicle is at a stop;

an idling stop enabling unit configured to automatically lift prohibition of execution and enable execution of the idling stop when a predetermined condition is met, and a lamp controlling unit configured to cause an AC lamp indicating that the air conditioner is in operation to be turned off during the idling stop.

2. The idling stop control unit according to claim 1, wherein the predetermined condition is met when the vehicle starts to run.

3. The idling stop control unit according to claim 1, wherein the predetermined condition is met when an interior temperature of the passenger compartment is close to a preset temperature.

4. The idling stop control unit according to claim 1, wherein the predetermined condition is met when an outlet temperature of air-conditioned air blown into the passenger compartment is close to a target outlet temperature.

5. The idling stop control unit according to claim 1, wherein the predetermined condition is met when a predetermined period of time has elapsed after the cancel of the idling stop.

6. The idling stop control unit according to claim 5, wherein the predetermined period of time is set so as to be longer in cooling when an outside temperature is higher and is set so as to be shorter in heating when the outside temperature is lower.

7. The idling stop control unit according to claim 5, wherein the predetermined period of time is set so as to be longer in cooling when solar radiation is larger and is set so as to be shorter in heating when the solar radiation is smaller.

8. The idling stop control unit according to claim 1, wherein the switch configured to change the air conditioning state is one of an air conditioner switch configured to start a compressor of the air conditioner and an automatic control switch configured to adjust air volume, outlet temperature, and blowout mode.

9. The idling stop control unit according to claim 1, wherein the switch configured to change the air conditioning state is a switch configured to adjust outlet temperature or air volume, and the idling stop prohibiting unit is configured to cancel the idling stop and to restart the engine when the switch is operated to increase air conditioner load.

10. A method of controlling idling stop in a vehicle including an air conditioner control unit which controls an air conditioning state of a passenger compartment of the vehicle, the method comprising:

canceling an idling stop to restart an engine and prohibiting execution of the idling stop when a switch for changing the air conditioning state is operated during the idling stop, in which the engine is stopped when the vehicle is at a stop;

automatically lifting the prohibition and enabling execution of the idling stop when a predetermined condition is met, and causing an AC lamp indicating that the air conditioner is in operation to be turned off during the idling stop.

11. An idling stop control unit provided in a vehicle including an air conditioner control unit which controls an air conditioning state of a passenger compartment of the vehicle, the idling stop control unit comprising:

idling stop prohibiting means for canceling an idling stop to restart an engine and prohibiting execution of the idling stop when a switch for changing the air conditioning state is operated during the idling stop, in which the engine is stopped when the vehicle is at a stop;
idling stop enabling means for automatically lifting the prohibition and enabling execution of idling stop when a predetermined condition is met, and
lamp controlling means for causing an AC lamp indicating that the air conditioner is in operation to be turned off during the idling stop.

\* \* \* \* \*